(12) United States Patent
Shair et al.

(10) Patent No.: US 10,780,614 B2
(45) Date of Patent: Sep. 22, 2020

(54) SYSTEM AND METHOD FOR FORMING STACKED MATERIALS

(71) Applicant: General Electric Company, Schenectady, NY (US)

(72) Inventors: Sultan Shair, Bavaria (DE); Martin Petersen, Bavaria (DE); Andreas Lutz, Bavaria (DE); Krishnan Balaji Thattai Parthasarathy, Glenville, NY (US); Stefaan Guido Van Nieuwenhove, Bavaria (DE); Thomas Kluge, Bavaria (DE); James Duvall Bollacker, Albany, NY (US); Anja Lena Nieratschker, Bavaria (DE)

(73) Assignee: General Electric Company, Schenectady, NY (US)

( * ) Notice: Subject to any disclaimer, the term of this patent is extended or adjusted under 35 U.S.C. 154(b) by 713 days.

(21) Appl. No.: 15/163,172

(22) Filed: May 24, 2016

(65) Prior Publication Data

US 2017/0341278 A1 Nov. 30, 2017

(51) Int. Cl.
*B29C 43/20* (2006.01)
*B29C 43/12* (2006.01)
(Continued)

(52) U.S. Cl.
CPC .............. *B29C 43/20* (2013.01); *B29C 43/12* (2013.01); *B29C 66/00145* (2013.01); *B29C 70/44* (2013.01); *B29L 2009/00* (2013.01)

(58) Field of Classification Search
CPC ... B29C 43/20; B29C 66/00145; B29C 43/12; B29C 70/44; B29C 70/48; B29C 70/42; B29C 70/46; B29C 51/004; B29L 2009/00
See application file for complete search history.

(56) References Cited

U.S. PATENT DOCUMENTS

| | | | |
|---|---|---|---|
| 4,034,054 A | | 7/1977 | Sauer |
| 5,037,599 A | * | 8/1991 | Olson ................. B29C 51/28 264/136 |

(Continued)

FOREIGN PATENT DOCUMENTS

| | | |
|---|---|---|
| CN | 101489768 A | 7/2009 |
| CN | 101835583 A | 9/2010 |

(Continued)

OTHER PUBLICATIONS

Smiley, A.J., et al., "Analysis of the Diaphragm Forming of Continuous Fiber Reinforced Thermoplastics," Journal of Thermoplastic Composite Materials, vol. 1, Issue 4, pp. 298-321 (Oct. 1988).

(Continued)

*Primary Examiner* — Leith S Shafi
(74) *Attorney, Agent, or Firm* — Armstrong Teasdale LLP

(57) ABSTRACT

A system for forming stacked material includes a housing defining an interior space. The housing includes a bottom wall and a side wall coupled to the bottom wall. At least one tool is configured to shape the stacked material. The at least one tool is disposed within the interior space. A membrane extends at least partially over the bottom wall and is spaced a distance from the bottom wall. The membrane is configured to move towards the bottom wall. At least one intensifier mechanism is disposed in the interior space and is configured to induce a force against a portion of the stacked material and against the at least one tool as the membrane is moved towards the bottom wall.

18 Claims, 12 Drawing Sheets

(51) Int. Cl.
B29C 70/44 (2006.01)
B29C 65/00 (2006.01)
B29L 9/00 (2006.01)

(56) References Cited

U.S. PATENT DOCUMENTS

| | | | |
|---|---|---|---|
| 5,152,949 A * | 10/1992 | Leoni | B29C 43/3642 |
| | | | 264/257 |
| 5,173,314 A | 12/1992 | Hosoi | |
| 5,236,646 A * | 8/1993 | Cochran | B29C 70/44 |
| | | | 156/286 |
| 5,427,518 A | 6/1995 | Morizot et al. | |
| 5,648,109 A | 7/1997 | Gutowski et al. | |
| 6,017,484 A | 1/2000 | Hale | |
| 6,146,576 A | 11/2000 | Blackmore | |
| 6,270,603 B1 | 8/2001 | Westerman et al. | |
| 6,484,776 B1 | 11/2002 | Meilunas et al. | |
| 7,588,711 B2 | 9/2009 | Depase et al. | |
| 7,758,786 B2 | 7/2010 | Nemchick et al. | |
| 8,142,181 B2 | 3/2012 | Willden et al. | |
| 8,162,652 B2 | 4/2012 | Marengo et al. | |
| 8,303,761 B2 | 11/2012 | Inserra Imparato et al. | |
| 8,557,165 B2 | 10/2013 | Jones | |
| 8,585,952 B2 | 11/2013 | Packer et al. | |
| 8,628,709 B2 | 1/2014 | Blot et al. | |
| 9,862,122 B2 | 1/2018 | Santiago | |
| 9,868,237 B2 | 1/2018 | Filsinger | |
| 2004/0222562 A1 | 11/2004 | Kirchner | |
| 2009/0084493 A1 | 4/2009 | Westerdahl et al. | |
| 2009/0197050 A1 | 8/2009 | Pridie | |
| 2010/0193115 A1 | 8/2010 | Inserra Imparato et al. | |
| 2010/0310818 A1 * | 12/2010 | Pridie | B29C 43/3642 |
| | | | 428/114 |
| 2011/0259515 A1 | 10/2011 | Roller et al. | |
| 2012/0018089 A1 | 1/2012 | Gueret et al. | |
| 2013/0341816 A1 | 12/2013 | Bergmann | |
| 2016/0031164 A1 | 2/2016 | Downs et al. | |
| 2016/0375675 A1 | 12/2016 | Pham | |
| 2017/0072647 A1 | 3/2017 | Perrillat et al. | |
| 2017/0252982 A1 * | 9/2017 | Knutson | B29C 53/02 |
| 2017/0341278 A1 | 11/2017 | Shair et al. | |
| 2017/0341310 A1 | 11/2017 | Thattai Parthasarathy et al. | |

FOREIGN PATENT DOCUMENTS

| | | |
|---|---|---|
| CN | 104441697 A | 3/2015 |
| EP | 0369207 B1 | 5/1990 |
| EP | 0 659 541 B1 | 4/1998 |
| EP | 2334486 B1 | 12/2012 |
| EP | 2 561 978 A2 | 2/2013 |
| EP | 3 067 182 A1 | 9/2016 |
| FR | 2 689 809 A1 | 10/1993 |
| JP | 363-144037 A | 6/1988 |
| JP | 10507697 A | 7/1998 |
| JP | 2002248694 A | 9/2002 |
| JP | 2004294113 A | 10/2004 |
| JP | 2006123404 A | 5/2006 |
| JP | 2007260925 A | 10/2007 |
| JP | 2014504566 A | 2/2014 |
| JP | 2015104895 A | 6/2015 |
| WO | 9605386 A1 | 2/1996 |
| WO | 2009/044194 A2 | 4/2009 |

OTHER PUBLICATIONS

International Search Report and Written Opinion issued in connection with corresponding PCT Application No. PCT/US17/032130 dated Aug. 2, 2017.
Marquez, P.D., Additive intensifier, GE co-pending U.S. Appl. No. 15/486,346, filed Apr. 13, 2017.
Clerico, M., "Materials Forming Technologies of Thermoplastic Matrix Composites," Interplastics, vol. 16, No. 3, pp. 76-86 (May-Jun. 1993).
International Search Report and Written Opinion issued in connection with corresponding PCT Application No. PCT/US2017/027516 dated Aug. 24, 2017.

* cited by examiner

SYSTEM AND METHOD FOR FORMING STACKED MATERIALS

BACKGROUND

The field of the disclosure relates generally to systems for forming stacked materials and, more particularly, to systems that include membranes to facilitate forming stacked materials.

At least some known systems are used to form stacked materials into composite laminate components. The stacked materials include a plurality of layers or plies of composite material that provide the composite laminate component with improved engineering properties. For example, the stacked materials include layers of any of the following materials: prepregs, dry fabrics, carbon fabrics, tackified fabrics, release films, backing paper, vacuum films, liners, membranes, carbon fiber, glass, polymeric fibers such as polyimides and polyethylenes, ceramic matrix composites, silicon carbide, and alumina. In at least some systems, the stacked material is positioned adjacent to a tool and forced against the tool to shape the stacked material into the component shape. In some systems, a membrane is used to facilitate shaping the stacked material. The membrane is extended over the stacked material and/or tool and positioned in a controlled manner to cause the tool to shape the stacked material.

In at least some known systems, the tool has complex geometries, such as overhangs, undercuts, concave surfaces, and convex surfaces. However, the membrane bridges over these complex geometries and does not cause the stacked material to be adequately compacted. As a result, the stacked material is not properly formed adjacent to these complex geometries. Therefore, additional processing, such as debulking, is required to properly form the stacked material into the desired component.

BRIEF DESCRIPTION

In one aspect, a system for forming stacked material is provided. The system includes a housing defining an interior space. The housing includes a bottom wall and a side wall coupled to the bottom wall. At least one tool is configured to shape the stacked material. The at least one tool is disposed within the interior space. A membrane extends at least partially over the bottom wall and is spaced a distance from the bottom wall. The membrane is configured to move towards the bottom wall. At least one intensifier mechanism is disposed in the interior space and is configured to induce a force against a portion of the stacked material and against the at least one tool as the membrane is moved towards the bottom wall.

In another aspect, a system for forming stacked material is provided. The system includes a housing defining an interior space. The housing includes a bottom wall and a side wall coupled to the bottom wall. At least one tool is configured to shape the stacked material. The at least one tool is disposed within the interior space. A membrane extends at least partially over the bottom wall and is spaced a distance from the bottom wall. The membrane is configured to move towards the bottom wall. At least one insert is in the interior space.

In yet another aspect, a method of forming stacked material is provided. The method includes coupling the stacked material to a tool disposed in an interior space of a housing and moving a membrane towards the tool in the interior space of the housing. The stacked material is shaped using the tool. The method further includes moving an intensifier mechanism such that the stacked material is compressed at predetermined locations.

DRAWINGS

These and other features, aspects, and advantages of the present disclosure will become better understood when the following detailed description is read with reference to the accompanying drawings in which like characters represent like parts throughout the drawings, wherein.

Figure 1:
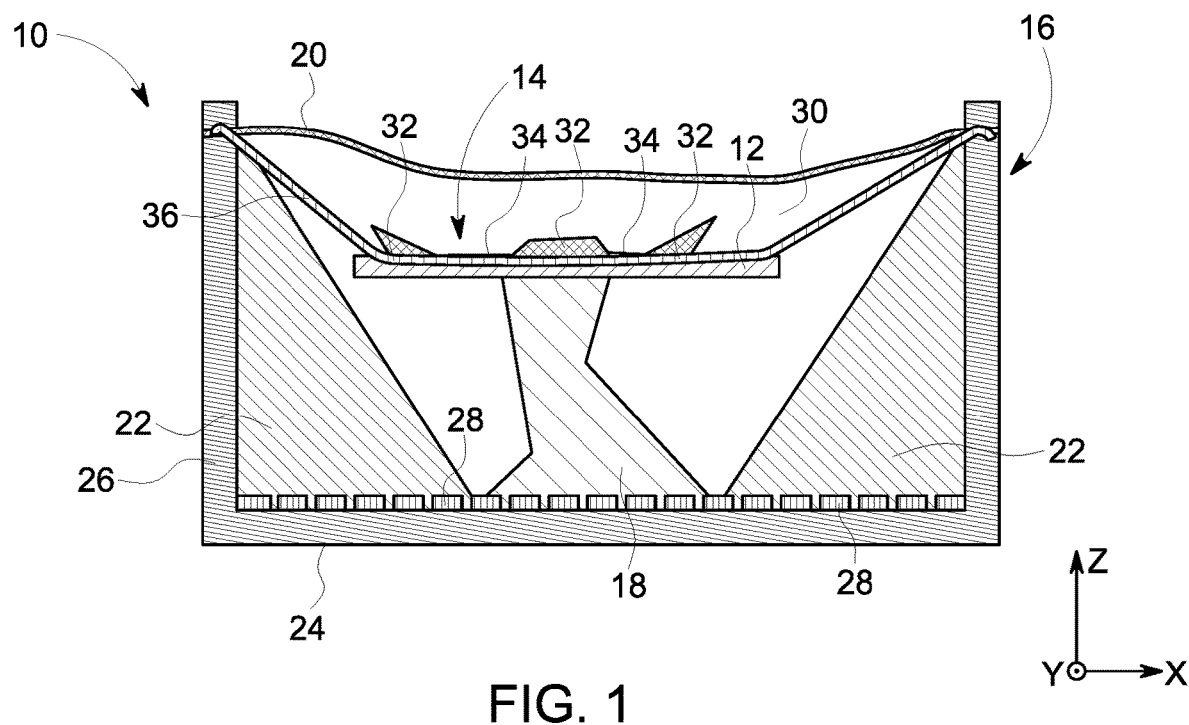
FIG. 1 is a side view of an exemplary system for forming stacked material including an intensifier mechanism.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

The systems described herein include a membrane to facilitate forming stacked material into a component. The system includes a housing defining an interior space and a tool disposed in the interior space. The membrane is moved in the interior space towards the tool. In some embodiments, at least one insert is disposed in the interior space to control movement of the membrane, reduce stretching of the membrane, and provide a controlled movement of the membrane. In further embodiments, at least one intensifier mechanism is disposed in the interior space to facilitate shaping the stacked material with the tool. The at least one intensifier mechanism is configured to cause the tool to shape the component into complex geometries. In some embodiments, the at least one intensifier mechanism provides contact pressure between the stacked material and the tool for increased compaction of the stacked material.

Figure 2:
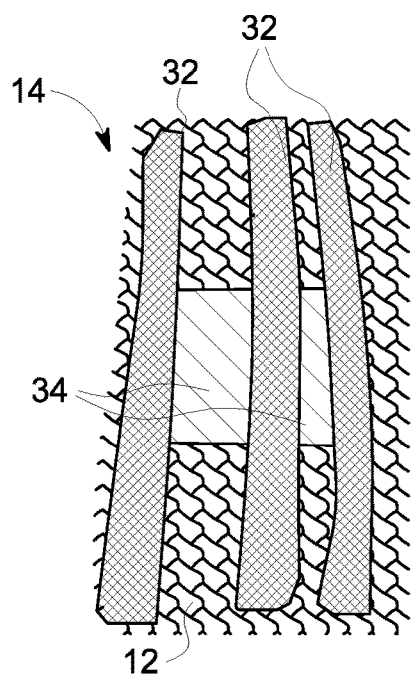
FIG. 2 is a plan view of the intensifier mechanism of the system shown in FIG. 1.

FIG. 1 is a side view of a system 10 for forming stacked material 12 including an intensifier mechanism 14. FIG. 1 includes an X-axis, a Y-axis, and a Z-axis for reference during the following description. FIG. 2 is a plan view of intensifier mechanism 14. System 10 includes intensifier mechanism 14, a housing 16, a tool 18, a membrane 20, and inserts 22. Housing 16 includes a bottom wall 24, a side wall 26 coupled to bottom wall 24, and a perforated plate 28 disposed on bottom wall 24. Housing 16 defines an interior space 30. In alternative embodiments, system 10 has any configuration that enables system 10 to operate as described herein. For example, in some embodiments, tool 18, inserts 22, and/or housing 16 are integrally formed.

In the exemplary embodiment, stacked material 12 includes a plurality of layers or plies of composite material. In alternative embodiments, stacked material 12 includes any layers that enable system 10 to operate as described herein. For example, in some embodiments, stacked material 12 includes layers of any of the following materials, without limitation: prepregs, dry fabrics, carbon fabrics, tackified fabrics, release films, backing paper, vacuum films, liners, membranes, carbon fiber, glass, polymeric fibers such as polyimides and polyethylenes, ceramic matrix composites, silicon carbide, and alumina.

During operation of system 10, a negative pressure is generated in interior space 30 such that membrane 20 is drawn towards bottom wall 24. As membrane 20 moves towards bottom wall 24, membrane 20 contacts stacked material 12, tool 18, side wall 26, inserts 22, and intensifier mechanism 14. Intensifier mechanism 14 is positioned on stacked material 12 adjacent tool 18 such that intensifier mechanism 14 induces a force in stacked material 12 as membrane 20 moves towards bottom wall 24. Intensifier mechanism 14 is configured to move in directions along the X-axis, Z-axis, and Y-axis such that intensifier mechanism 14 contacts stacked material 12 at predetermined locations. In particular, intensifier mechanism 14 induces a force against portions of stacked material 12 adjacent complex geometries on tool 18 to facilitate tool 18 shaping stacked material 12.

In some embodiments, intensifier mechanism 14 is coupled to stacked material 12 at fixed positions. In other embodiments, intensifier mechanism 14 is loosely positioned on stacked material 12. In alternative embodiments, intensifier mechanism 14 is coupled to any of housing 16, tool 18, and membrane 20. For example, in some embodiments, intensifier mechanism 14 extends beyond stacked material 12 and couples to tool 18. In further embodiments, at least a portion of intensifier mechanism 14 is fixed to tool 18. In still further embodiments, intensifier mechanism 14 is integral with tool 18. In some embodiments, intensifier mechanism 14 is removably coupled to tool 18.

In the exemplary embodiment, intensifier mechanism 14 is disposed in interior space 30 and includes bodies 32 and support 34. Each body 32 has a shape that corresponds to a desired shape of a component formed from stacked material 12 and engages a portion of tool 18. Support 34 extends between bodies 32 and is coupled to bodies 32 such that bodies 32 are movable in relation to housing 16. In particular, bodies 32 and support 34 are movably coupled together such that at least a portion of bodies 32 pivots about support 34. Accordingly, support 34 forms a hinge. In some embodiments, each support 34 and/or bodies 32 includes any number of segments, including one, that enable system 10 to operate as described herein. In the exemplary embodiment, support 34 includes two segments coupled to bodies 32 at positions that facilitate bodies 32 inducing forces in stacked material 12 at precise locations. In further embodiments, support 34 includes a plurality of segments extending between the same bodies 32. In some embodiments, support 34 extends the full length of intensifier mechanism 14. In alternative embodiments, intensifier mechanism 14 has any configuration that enables system 10 to operate as described herein. For example, in some embodiments, intensifier mechanism 14 is formed as a single integrated component. In further embodiments, intensifier mechanism 14 includes at least one body 32 embedded in support 34. In still further embodiments, intensifier mechanism 14 includes at least one body 32 and support 34 is omitted.

Also, in the exemplary embodiment, intensifier mechanism 14 is made from materials that facilitate the positioning of intensifier mechanism 14 during operation of system 10. For example, support 34 is made from a material that is flexible to enable bodies 32 to move and has some rigidity to maintain proper positioning of intensifier mechanism 14 in relation to stacked material 12. Bodies 32 are substantially rigid to retain shape during positioning. Moreover, intensifier mechanism 14 is made from materials that withstand relatively high temperatures. For example, support 34 and bodies 32 remain sufficiently rigid to retain their shape when system 10 is heated. In alternative embodiments, intensifier mechanism 14 is made of any materials that enable system 10 to operate as described herein. For example, in some embodiments, intensifier mechanism 14 is made from materials that are compatible with stacked material 12, e.g., materials that do not contaminate stacked material 12 when intensifier mechanism 14 directly contacts stacked material 12. In further embodiments, bodies 32 are made from semi-rigid materials. For example, in some embodiments, bodies 32 include any of the following materials: silicone, rubber, semi-rigid plastic, and combinations thereof.

In addition, in the exemplary embodiment, system 10 further includes a liner 36 extending between intensifier mechanism 14 and stacked material 12. Liner 36 inhibits intensifier mechanism 14 and membrane 20 contacting stacked material 12. Liner 36 is coupled to side wall 26 and maintained in tension to facilitate forming stacked material 12. In particular, liner 36 reduces indentations and irregularities in stacked material 12 when intensifier mechanism 14 induces a force in stacked material 12. Moreover, liner 36 facilitates removal of formed stacked material 12 from system 10 and reduces deterioration and contamination of system 10. In some embodiments, liner 36 is a release film. In further embodiments, liner 36 is a polypropylene material. In alternative embodiments, system 10 includes any liner 36 that enables system 10 to operate as described herein. For example, in some embodiments, intensifier mechanism 14 is semi-rigid and liner 36 is positioned above intensifier mechanism 14 and stacked material 12. In further embodiments, liner 36 is coupled to any of stacked material 12, intensifier mechanism 14, and membrane 20 that enable system 10 to operate as described herein.

Figure 3:
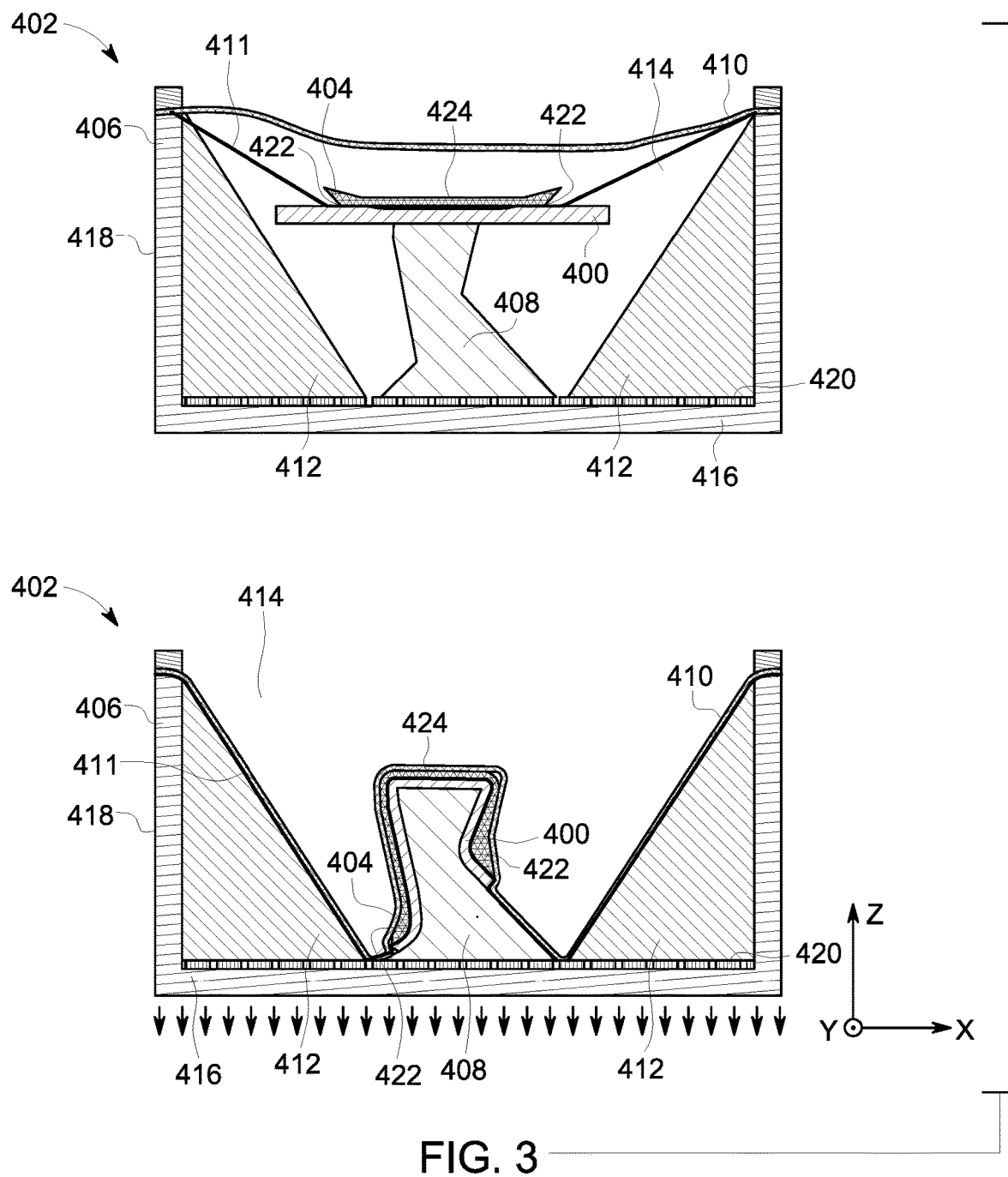
FIG. 3 is a schematic diagram of a sequence for forming stacked materials using an exemplary system including an intensifier mechanism positioned on the stacked materials.

FIG. 3 is a schematic diagram of a sequence for forming stacked material 400 using a system 402 including an intensifier mechanism 404 positioned on stacked materials 400. FIG. 3 includes an X-axis, a Y-axis, and a Z-axis for reference during the following description. System 402 includes intensifier mechanisms 404, a housing 406, a tool 408, a membrane 410, a liner 411, and inserts 412. Housing 406 defines an interior space 414 and includes a bottom wall 416, a side wall 418 coupled to bottom wall 416, and a perforated plate 420 disposed on bottom wall 416.

Intensifier mechanism 404 is positioned on stacked material 400 adjacent tool 408 such that intensifier mechanism 404 induces a force in stacked material 400 as membrane 410 moves towards bottom wall 416. In some embodiments, liner 411 is positioned between intensifier mechanism 404 and stacked material 400. In the exemplary embodiment, intensifier mechanism 404 includes a plurality of bodies 422 and a support 424 coupling bodies 422 together. In particular, intensifier mechanism 404 includes two bodies 422 that each correspond to a shape of a portion of tool 408. Support 424 is flexible and facilitates positioning intensifier mechanism 404 as membrane 410 moves towards bottom wall 416. In particular, intensifier mechanism 404 is positioned adjacent tool 408 such that bodies 422 induce forces in stacked material 400 and the portions of tool 408 with shapes corresponding to intensifier mechanism 404. In alternative embodiments, intensifier mechanism 404 has any configuration that enables system 402 to operate as described herein. For example, in some embodiments, intensifier mechanism 404 includes one body 422. In further embodiments, intensifier mechanism 404 includes a plurality of bodies 422 that are not coupled together by support 424.

Figure 4:
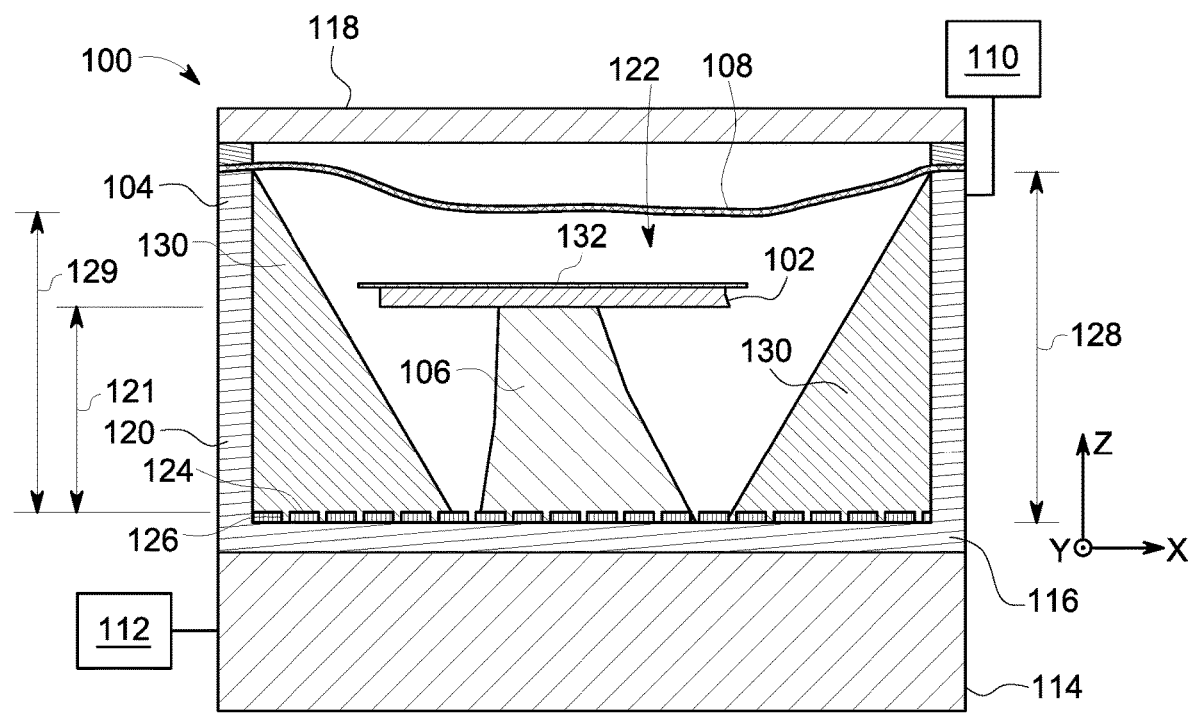
FIG. 4 is a side view of an exemplary system for forming stacked material.
Figure 5:
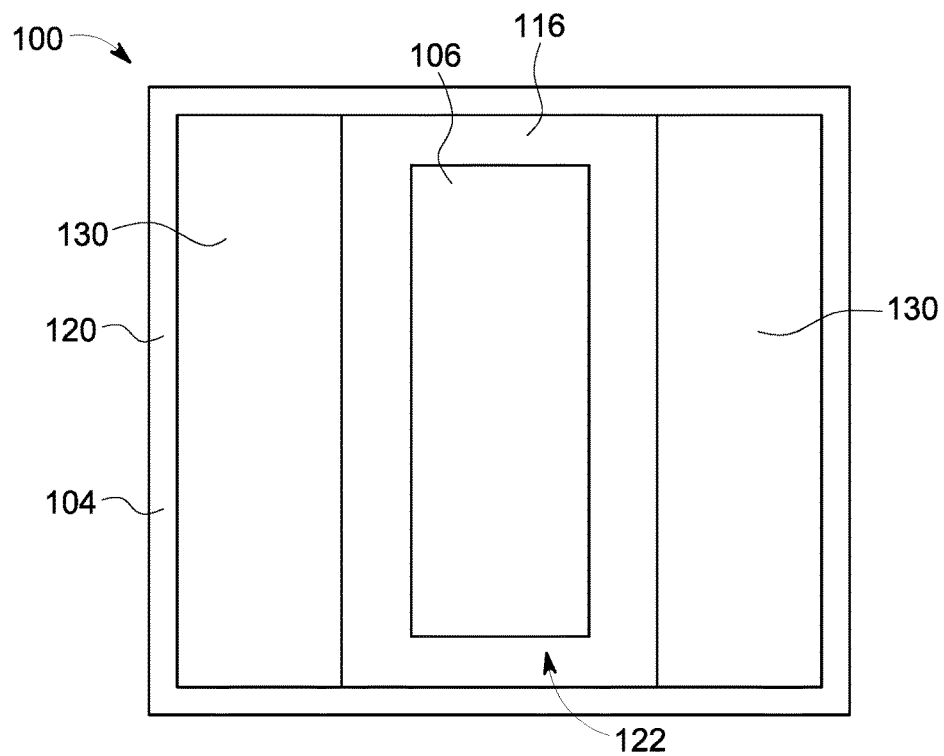
FIG. 5 is a plan view of the system shown in FIG. 4.

FIG. 4 is a side view of a system 100 for forming stacked material 102. FIG. 4 includes an X-axis, a Y-axis, and a Z-axis for reference during the following description. FIG. 5 is a plan view of system 100. FIG. 5 includes an X-axis, a Y-axis, and a Z-axis for reference during the following description. System 100 includes a housing 104, a tool 106, a membrane 108, a temperature control unit 110, a controller 112, and a vacuum source 114. Housing 104 includes a bottom wall 116, a top wall 118, and a side wall 120 extending between bottom wall 116 and top wall 118. Bottom wall 116, top wall 118, and side wall 120 define an interior space 122. In the exemplary embodiment, side wall 120 is coupled to bottom wall 116 and top wall 118 such that side wall 120 is substantially orthogonal to bottom wall 116 and top wall 118. Moreover, bottom wall 116 is substantially rectangular and side wall 120 extends around the perimeter of bottom wall 116. Accordingly, housing 104 is substantially box-shaped. In some embodiments, at least a portion of at least one of bottom wall 116, top wall 118, and side wall 120 is positionable between open and closed positions to facilitate access to interior space 122. In further embodiments, housing 104 includes an access panel (not shown). In alternative embodiments, housing 104 has any configuration that enables system 100 to operate as described herein. For example, in some embodiments, top wall 118 is omitted. In further embodiments, at least one of bottom wall 116, top wall 118, and side wall 120 is angled to facilitate controlling the movement of membrane 108.

In the exemplary embodiment, bottom wall 116 includes a perforated plate 124. Perforated plate 124 facilitates airflow 125 between interior space 122 and the exterior of housing 104. In particular, perforated plate 124 defines a plurality of openings 126 for airflow 125 through perforated plate 124. Vacuum source 114 is coupled in flow communication with openings 126 to control the airflow 125 through perforated plate 124. In addition, in some embodiments, any components of system 100, such as tool 106, include openings 126 to facilitate airflow 125 through housing 104. Openings 126 are evenly spaced throughout perforated plate 124 such that airflow 125 through perforated plate 124 is substantially uniform. Other than openings 126, housing 104 is substantially airtight such that the environment of interior space 122 is controlled during operation of system 100. In alternative embodiments, housing 104 includes any openings 126 that enable system 100 to operate as described herein. In further embodiments, openings 126 are omitted.

Also, in the exemplary embodiment, tool 106 is disposed in interior space 122 and configured to support stacked material 102. Stacked material 102 is coupled to tool 106 such that stacked material 102 is maintained at a desired tension. Tool 106 is coupled to bottom wall 116 and spaced from side wall 120 along the X-axis and the Y-axis. Tool 106 is configured to shape stacked material 102 into a component having a desired shape. For example, in some embodiments, tool 106 shapes stacked material into any of the following, without limitation: a geometrically-shaped structure, a component including undercuts, an airfoil, a turbine component, a shell, a stiffening element, a skin, a guide vane, an attachments clip, an L-frame, a Z-frame, an Omega-frame, a U-frame, and a shaped frame. In alternative embodiments, tool 106 has any configuration that enables system 100 to operate as described herein.

In addition, in the exemplary embodiment, membrane 108 extends over bottom wall 116. In particular, membrane 108 is coupled to side wall 120 a distance 128 above bottom wall 116 in the Z-direction. Distance 128 is greater than a height 121 of tool 106. In alternative embodiments, distance 128 is any measurement that enables system 100 to operate as described herein. In the exemplary embodiment, membrane 108 is configured such that at least a portion of membrane 108 moves towards bottom wall 116 during operation of system 100. Membrane 108 is a flexible sheet structure and is at least partially elastic. At least initially, membrane 108 is spaced a minimum distance 129 from bottom wall 116. As membrane 108 moves toward bottom wall 116, membrane 108 stretches. Membrane 108 is coupled to side wall 120 such that membrane 108 is maintained in tension as membrane 108 moves toward bottom wall 116. The tension facilitates membrane 108 moving in a controlled manner and contacting objects evenly. In alternative embodiments, membrane 108 has any configuration that enables system 100 to operate as described herein. For example, in some embodiments, membrane 108 includes a bladder and/or diaphragm structure. Membrane 108 is formed from any materials that enable system 100 to operate as described herein. For example, in some embodiments, membrane 108 is formed from any of the following stretchable materials, without limitation: silicone, rubber, release liners, vacuum liners, and combinations thereof. In the exemplary embodiment, membrane 108 is elastic such that membrane 108 is repeatedly stretched. In alternative embodiments, membrane 108 is configured for only a single use.

Moreover, in the exemplary embodiment, inserts 130 are disposed in interior space 122. Inserts 130 are removably coupled to bottom wall 116 to facilitate repositioning inserts 130. Inserts 130 are positioned between side wall 120 and tool 106. In the exemplary embodiment, inserts 130 are inclined planes positioned adjacent side walls 120. Inserts 130 extend substantially the entire span of side walls 120 along the Y-axis. In alternative embodiments, inserts 130 have any configuration that enables system 100 to operate as described herein.

Figure 6:
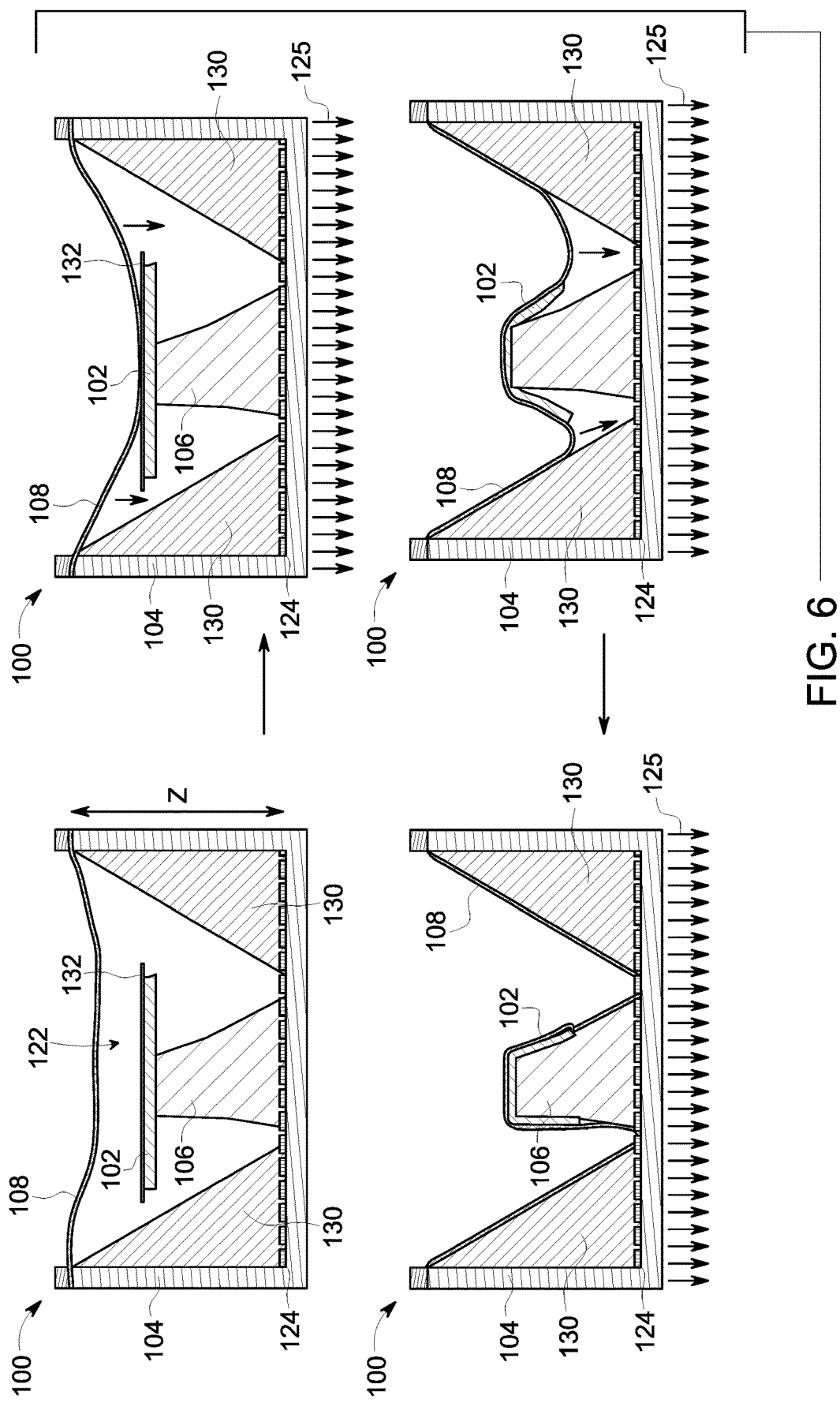
FIG. 6 is a schematic diagram of a sequence for forming stacked material using a first configuration of the system shown in FIG. 4.

FIG. 6 is a schematic diagram of a sequence for forming stacked material 102 using system 100 in a first configuration. In operation of system 100, vacuum source 114 generates a negative pressure, i.e., a vacuum, in interior space 122 to facilitate membrane 108 moving towards bottom wall 116. Controller 112 (shown in FIG. 4) controls vacuum source 114 to regulate the pressure of interior space 122 and thereby control movement of membrane 108. In addition, after stacked material 102 is formed, vacuum source 114 increases pressure in interior space 122 to cause membrane 108 to move away from bottom wall 116. In alternative embodiments, membrane 108 is configured to move in any manner that enables system 100 to operate as described herein. For example, in some embodiments, the pressure above membrane 108 is increased to force membrane 108 into interior space 122. In further embodiments, a biasing member is coupled to membrane 108 to facilitate controlled movement of membrane 108.

As membrane 108 is drawn towards bottom wall 116, membrane 108 contacts stacked material 102, tool 106, side wall 120, bottom wall 116, and inserts 130. In alternative embodiments, membrane 108 contacts any components of system 100 that enable system 100 to operate as described herein. In the exemplary embodiment, stacked material 102 includes a liner 132 for membrane 108 to contact. Liner 132 inhibits membrane 108 contacting stacked material 102. In some embodiments, liner 132 is removed after formation of stacked material 102. In alternative embodiments, liner 132 is omitted. In further embodiments, liner 132 is included in any components of system 100, including membrane 108, that enables system 100 to operate as described herein.

In the exemplary embodiment, membrane 108 stretches as membrane 108 moves towards bottom wall 116. In addition, membrane stretches as membrane 108 contacts stacked material 102, tool 106, side wall 120, and/or bottom wall 116. Inserts 130 at least partially support membrane 108 to reduce the amount membrane 108 stretches during operation of system 100. In addition, inserts 130 facilitate membrane 108 moving in a controlled manner towards bottom wall 116. As a result, inserts 130 facilitate system 100 forming stacked materials 102 with increased operating efficiency.

Also, in the exemplary embodiment, temperature control unit 110 maintains interior space 122 and stacked material 102 at a desired temperature during operation of system 100. In some embodiments, temperature control unit 110 includes a heating and/or cooling source to increase and/or decrease the temperature of interior space 122 and, thereby, control the pliability of stacked material 102. The heating and/or cooling source is disposed inside of housing 104, disposed outside of housing 104, and/or integrated into housing 104. In alternative embodiments, tool 106 is maintained at a desired temperature by temperature control unit 110 and a heating and/or cooling source. In further embodiments, temperature control unit 110 includes a temperature controlled enclosure, such as an oven or a cooler, and housing 104 is positioned at least partially within the temperature controlled enclosure. In alternative embodiments, temperature control unit 110 has any configuration that enables system 100 to operate as described herein.

Moreover, in the exemplary embodiment, controller 112 controls vacuum source 114 to control movement of membrane 108. In some embodiments, controller 112 controls any components of system 100 to facilitate the automation of the forming process. For example, in some embodiments, controller 112 controls a positioning member (not shown) to position stacked material 102 on tool 106. In further embodiments, controller 112 controls the movement and positioning of inserts 130. In addition, in some embodiments, controller 112 controls the positioning of intensifier mechanism 14, intensifier mechanisms 204 (shown in FIGS. 13-14 and described further below), and intensifier mechanisms 304 (shown in FIG. 15 and described further below), and intensifier mechanisms 404 (shown in FIG. 16 and described further below). In alternative embodiments, controller 112 has any configuration that enables system 100 to operate as described herein.

Figure 7:
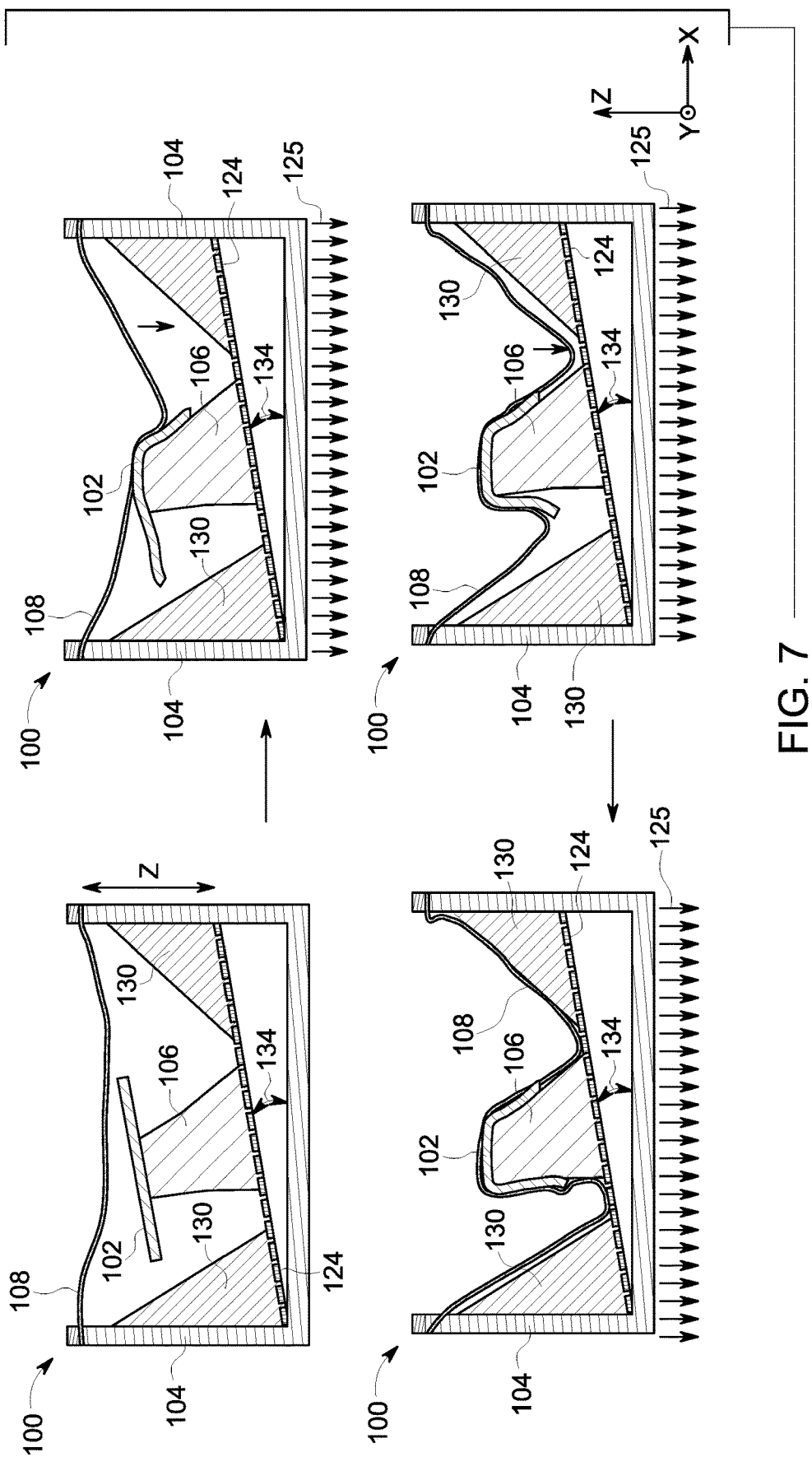
FIG. 7 is a schematic diagram of a sequence for forming stacked material using a second configuration of the system shown in FIG. 4.

FIG. 7 is a schematic diagram of a sequence for forming stacked material 102 using system 100 in a second configuration. FIG. 7 includes an X-axis and a Z-axis for reference during the following description. Perforated plate 124 is positioned at an angle 134 in relation to side wall 120. Positioning perforated plate 124 at angle 134 facilitates stacked material 102 contacting membrane 108 and tool 106. In addition, perforated plate 124 is at least partially raised a distance in the Z-direction. As a result, membrane 108 undergoes less stretching during operation of system 100 than if perforated plate 124 was located a greater distance from the starting position of membrane 108. Inserts 130 are shaped to accommodate the position of perforated plate 124. In particular, insert 130 adjacent the elevated portion of perforated plate 124 has a decreased height in the Z-direction in comparison to insert 130 adjacent the lower portion of perforated plate 124 such that the tops of insert 130 are approximately even with each other. As a result, inserts 130 contact membrane 108 at substantially the same point along the Z-axis during movement of membrane 108.

Figure 8:
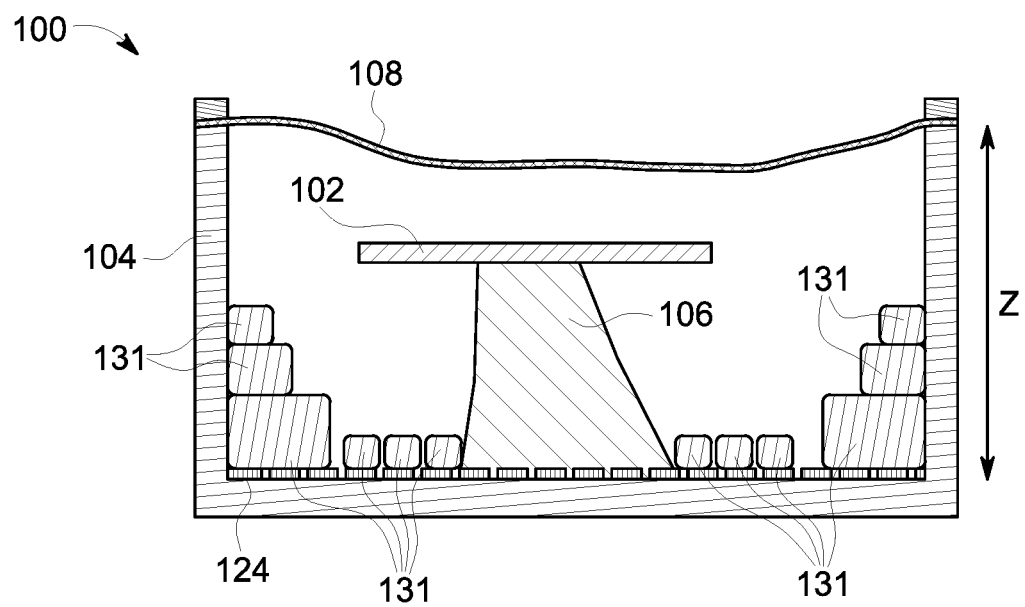
FIG. 8 is a side view of the system shown in FIG. 4 including a first set of inserts.
Figure 9:
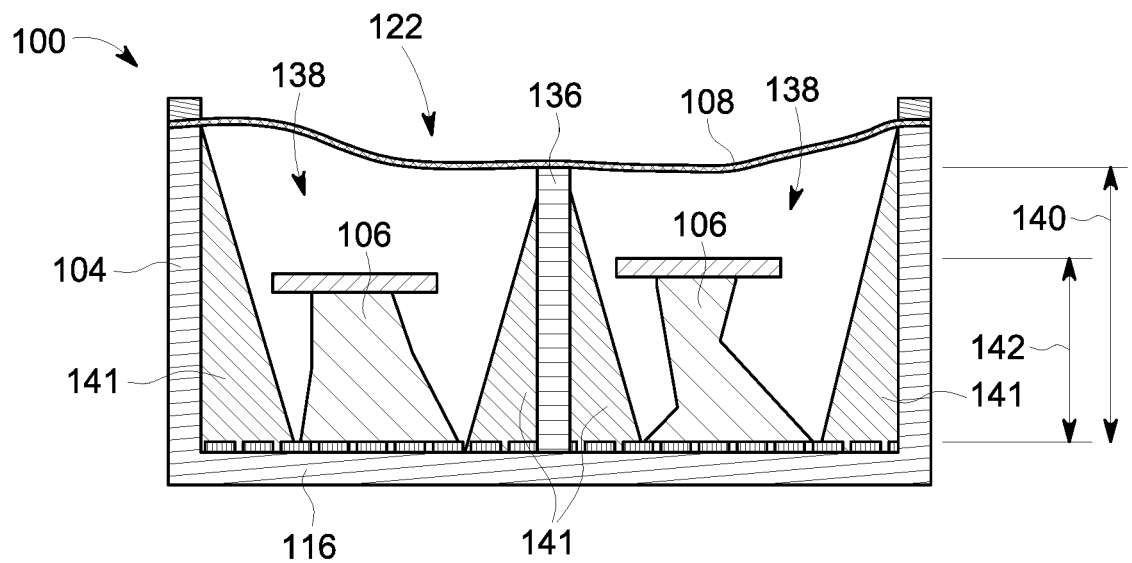
FIG. 9 is a side view of the system shown in FIG. 4 including a second set of inserts.
Figure 10:
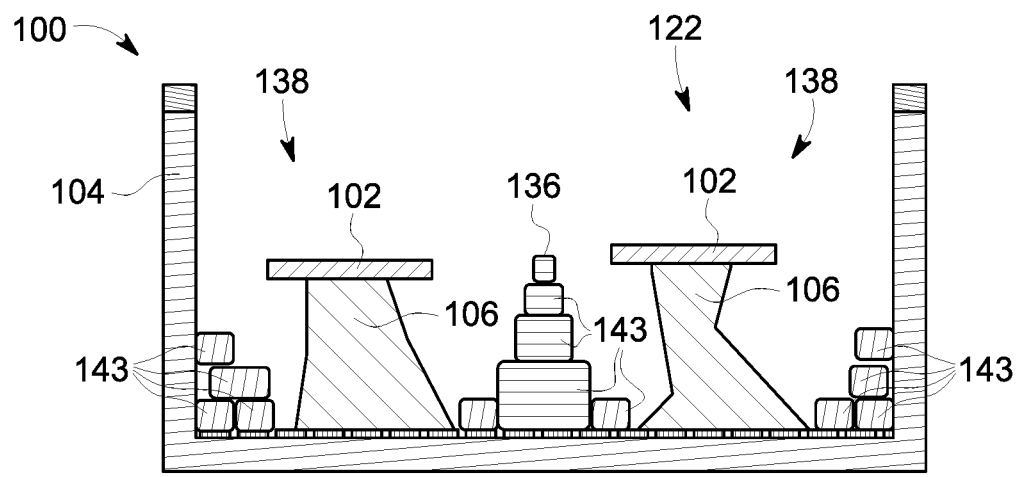
FIG. 10 is a side view of the system shown in FIG. 4 including a third set of inserts.

FIGS. 8-10 are side views of system 100 including a plurality of inserts 131. Inserts 131 have any shapes that enable system 100 to operate as described herein. For example, in some embodiments, inserts 131 have at least one of a cylindrical shape, a prism shape, and combinations thereof. In the exemplary embodiment, some inserts 131 are adjacent side wall 120 and some inserts 131 are adjacent tool 106. In addition, inserts 131 are stacked on top of each other to form structures having different heights and shapes. Inserts 131 include flexible and/or rigid materials. Inserts 131 that are flexible deform at least slightly as membrane 108 contacts inserts 131. Inserts 131 that are rigid maintain substantially the same shape as membrane 108 contacts inserts 131. Accordingly, the rigidity and flexibility of inserts 131 is adjusted to control the movement of membrane 108 and provide support for membrane 108. In alternative embodiments, inserts 131 have any configurations that enable system 100 to operate as described herein.

For example, FIG. 8 is a side view of system 100 including inserts 131 having rectangular prism shapes. Some inserts 131 are stacked vertically and some inserts 131 are aligned horizontally. FIG. 9 is a side view of system 100 including inserts 141 having a triangular prism shape. FIG. 10 is a side view of system 100 including inserts 143 having a rectangular prism shape.

With reference to FIGS. 9-10, system 100 includes inserts 136 that extend through interior space 122 and function as dividers to divide interior space 122 into a plurality of forming zones 138. A plurality of tools 106 are disposed in interior space 122 to facilitate forming a plurality of stacked materials 102. In particular, one forming tool 106 and one stacked material 102 are disposed in each forming zone 138. Insert 136 extends between tools 106 to define forming zones 138. In some embodiment, insert 136 has a height 140 greater than a height 142 of tool 106 such that membrane 108 contacts insert 136 prior to contacting stacked material 102 supported on tool 106. In some embodiments, insert 136 is formed by a single insert 130 having, for example, a substantially flat plate shape. In other embodiments, a plurality of inserts 130 are stacked to form insert 136. In alternative embodiments, insert 136 has any configuration that enables system 100 to operate as described herein. For example, in some embodiments insert 136 is permanently affixed to or integral with housing 104.

Figure 11:
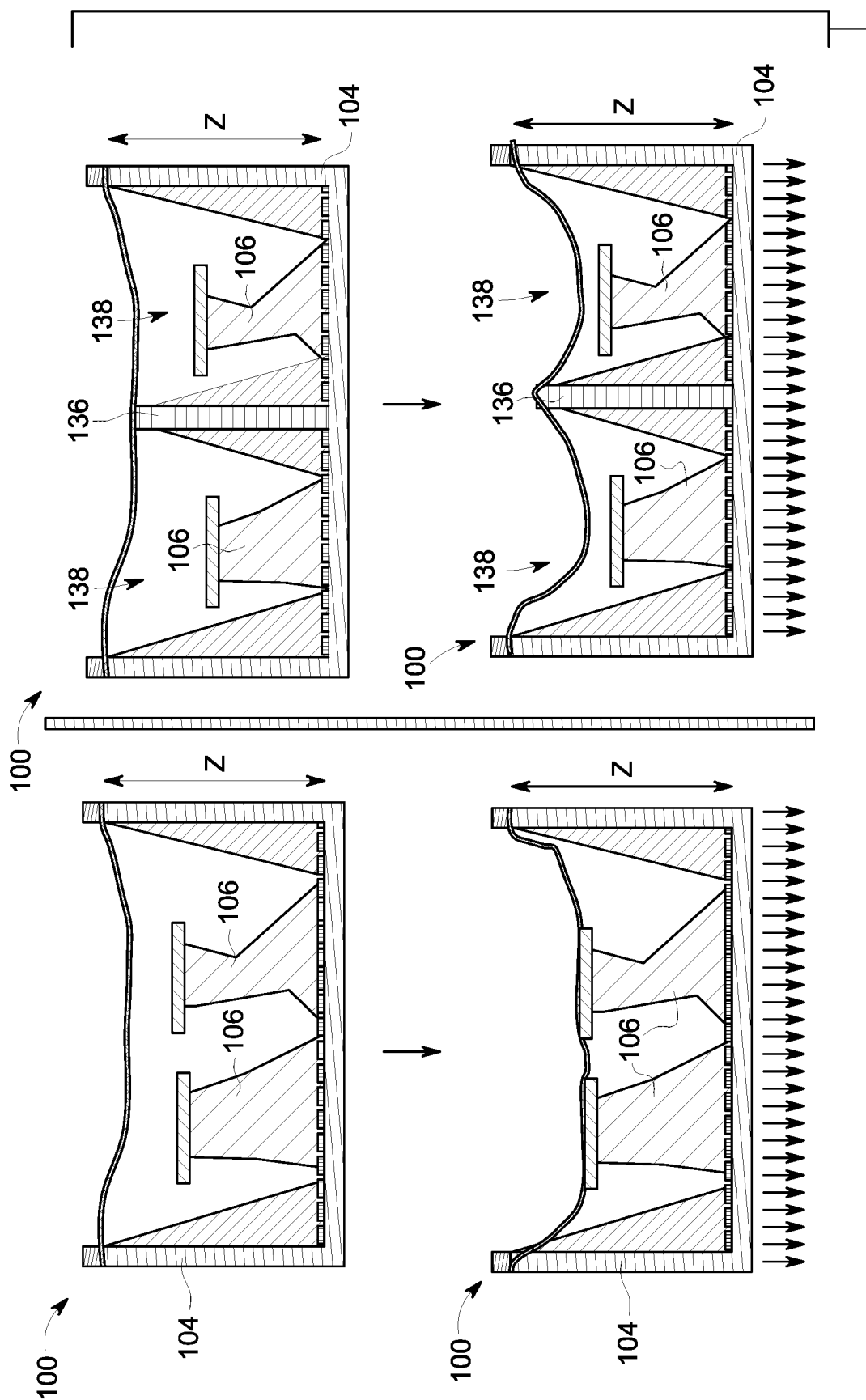
FIG. 11 is a schematic diagram of forming a plurality of stacked materials onto a plurality of tools using the system shown in FIG. 4.

FIG. 11 is a schematic diagram of forming a plurality of stacked materials 102 using system 100. In one embodiment, insert 136 is positioned between tools 106 to separate forming zones 138. In another embodiment, insert 136 is omitted. In further embodiments, insert 136 hermetically separates forming zones 138 such that forming zones 138 form separate controlled environments. Accordingly, the movement of membrane 108 in each forming zone 138 is separately controlled. Moreover, in some embodiments, forming zones 138 each include separate membranes 108. In alternative embodiments, forming zones 138 have any configuration that enables system 100 to operate as described herein.

Figure 12:
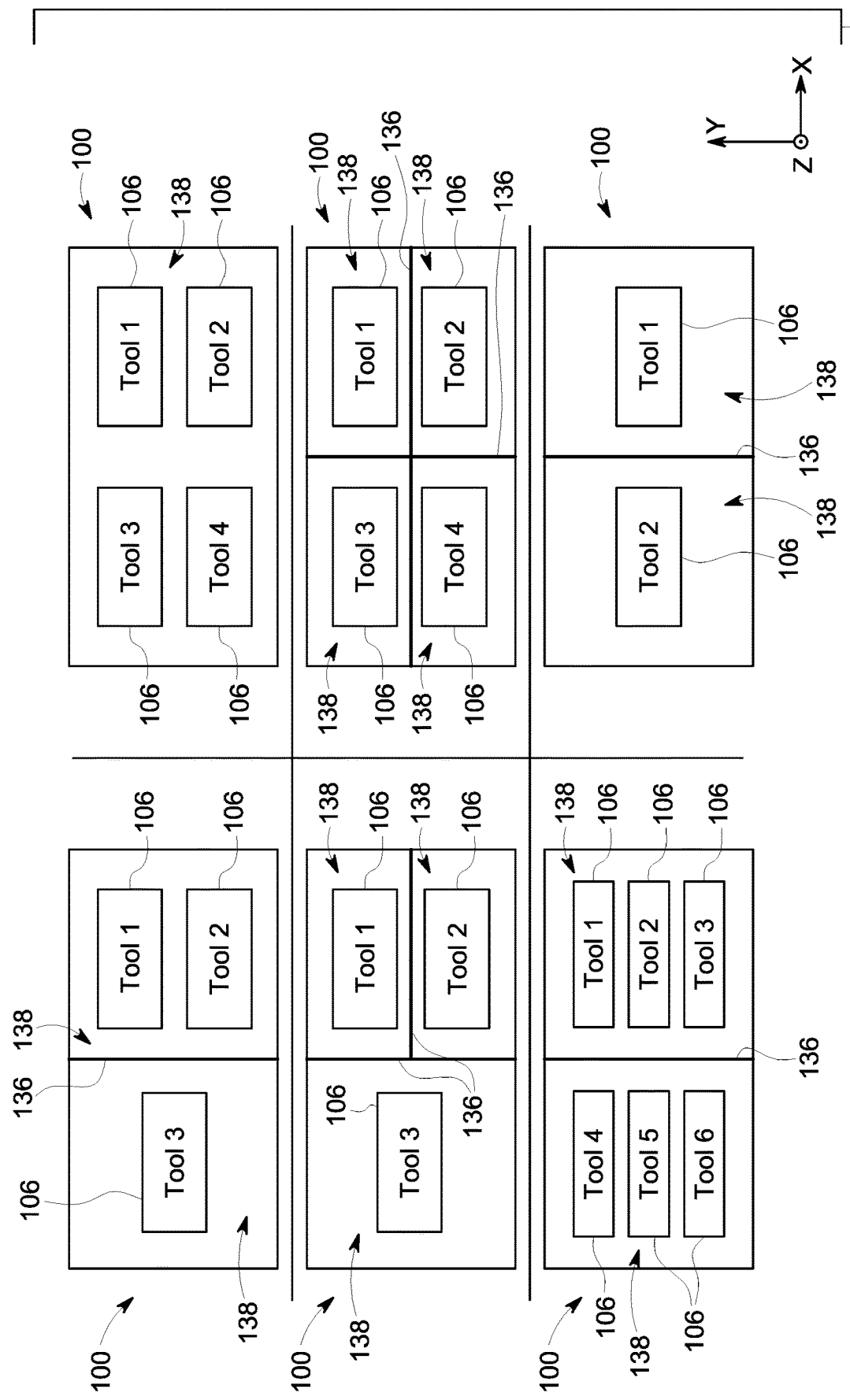
FIG. 12 is a plan view of a plurality of the systems shown in FIG. 4 configured for forming a plurality of stacked materials onto a plurality of tools.

FIG. 12 is a plan view of a plurality of systems 100 configured for forming a plurality of stacked materials 102. FIG. 12 includes an X-axis, a Y-axis, and a Z-axis for reference during the following description. Systems 100 include different number of tools 106 in different numbers of forming zones 138. Some forming zones 138 are separated by insert 136 and some forming zones 138 are not separated by insert 136. Forming zones 138, inserts 136, and tools 106 are spaced along the X-axis and the Y-axis. Each forming zone 138 includes at least one tool 106. In alternative embodiments, forming zones 138 have any configuration that enables system 100 to operate as described herein. In the exemplary embodiment, inserts 136 are substantially linear and positioned orthogonal or parallel to the X-axis and the Y-axis. In alternative embodiments, inserts 136 are non-linear. For example, in some embodiments, inserts 136 include any of the following without limitation: curves, S-shaped portions, C-shaped portions, and L-shaped portions. In further embodiments, inserts 136 are positioned at any angles in respect to the X-axis, a Y-axis, and a Z-axis that enable system 100 to operate as described herein.

Figure 13:
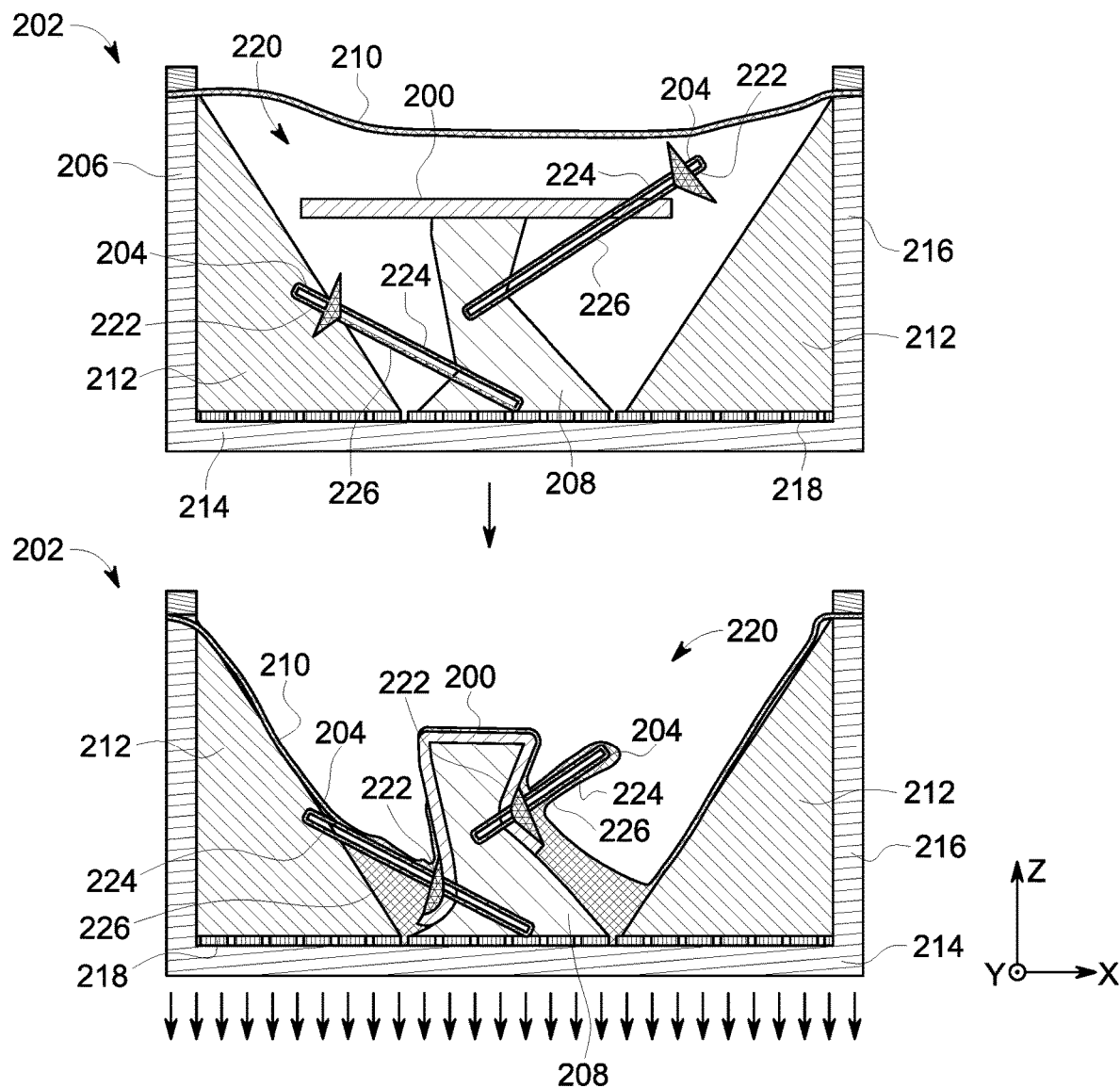
FIG. 13 is schematic diagram of a sequence for forming stacked material using an exemplary system including intensifier mechanisms.
Figure 14:
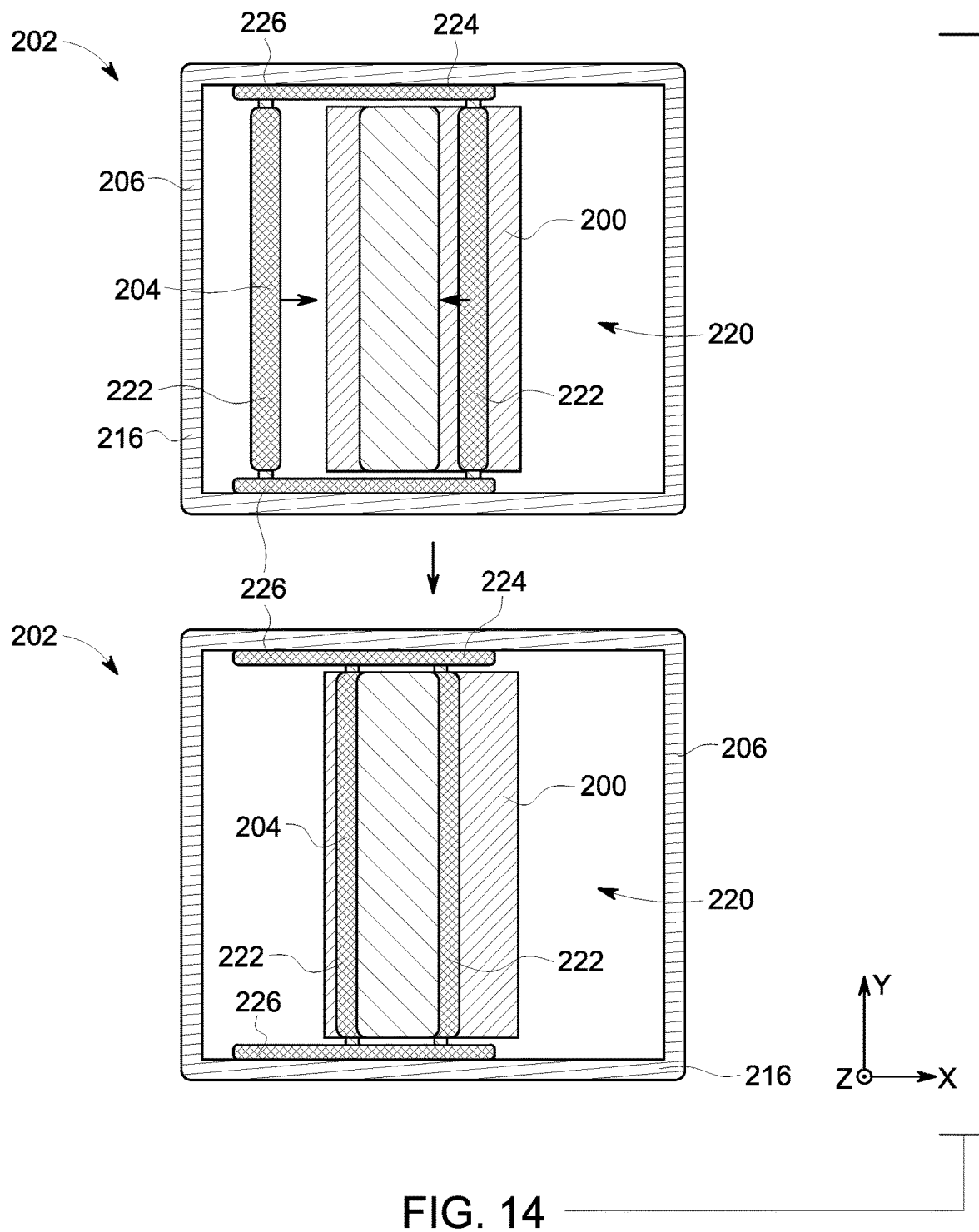
FIG. 14 is a schematic plan view of a sequence for forming stacked material using the system shown in FIG. 13.

FIG. 13 is a schematic diagram of a sequence of forming stacked material 200 using a system 202 including intensifier mechanisms 204. FIG. 13 includes an X-axis, a Y-axis, and a Z-axis for reference during the following description. FIG. 14 is a schematic plan view of a sequence of forming stacked materials using system 202. FIG. 14 includes an X-axis, a Y-axis, and a Z-axis for reference during the following description. System 202 includes intensifier mechanisms 204, a housing 206, a tool 208, a membrane 210, and inserts 212. Housing 206 includes a bottom wall 214, a side wall 216 coupled to bottom wall 214, and a perforated plate 218 disposed on bottom wall 214. Housing 206 defines an interior space 220. During operation of system 202, a negative pressure is generated in interior space 220 such that membrane 210 is drawn towards bottom wall 214. As membrane 210 moves towards bottom wall 214, membrane 210 contacts stacked material 200, tool 208, side wall 216, inserts 212, and intensifier mechanisms 204. When membrane 210 contacts intensifier mechanisms 204, intensifier mechanisms 204 move towards tool 208 and stacked material 200. Intensifier mechanisms 204 are configured to press stacked material 200 against tool 208 such that stacked material 200 is compacted. Intensifier mechanisms 204 are configured to extend and move in directions along the X-axis, Z-axis, and Y-axis such that intensifier mechanisms contact stacked material 200 at predetermined locations. In particular, intensifier mechanisms 204 induce a force against a portion of stacked material 200 adjacent complex geometries on tool 208 to facilitate tool 208 shaping stacked material 200. Moreover, intensifier mechanisms 204 limit the amount of stretching of membrane 210.

Intensifier mechanisms 204 are disposed in interior space 220 and include a body 222 and a support 224. Support 224 is coupled to housing 206 and body 222 such that body 222 is movable in relation to housing 206. In particular, body 222 and support 224 are movably coupled together such that body moves along support 224. Support 224 includes rails 226 coupled to opposed portions of side wall 216. In alternative embodiments, support 224 is coupled to any components of system 202 that enable system 202 to operate as described herein. In the exemplary embodiment, rails 226 are angled along side wall 216 such that body 222 moves in directions along both the X-axis and the Z-axis. Body 222 extends between rails 226 and has a shape that corresponds to a desired shape of a component formed from stacked material 12 and engages a portion of tool 208. In alternative embodiments, intensifier mechanisms 204 have any configuration that enables system 202 to operate as described herein. For example, in some embodiments, intensifier mechanisms 204 are positioned on the side of membrane 210 exterior to interior space 220 and compress membrane 210 and stacked material 200 against tool 208. In further embodiments, intensifier mechanisms 204 are integrated into and/or coupled to tool 208 and/or membrane 210.

In the exemplary embodiment, support 224 includes two rails 226 that are parallel. In some embodiments, support 224 includes any number of rails 226, including one, that enable system 202 to operate as described herein. In further embodiments, support 224 includes a plurality of rails 226 and at least two rails of the plurality of rails 226 are not parallel. For example, in some embodiments, body 222 has an asymmetric shape such that body 222 extends between rails 226 that are not parallel.

Also, in the exemplary embodiment, intensifier mechanisms 204 are positionable between multiple positions. In particular, intensifier mechanisms 204 move from a position spaced from tool 106 and stacked material 200 to a position where intensifier mechanisms contact stacked material 200 to press stacked material 200 against tool 208 at a desired pressure. For example, in a first position, intensifier mechanisms 204 do not exert a substantial force against stacked material 200. In a second position, intensifier mechanisms 204 cause compaction of stacked material 200. In alternative embodiments, intensifier mechanisms 204 are positionable in any positions that enable system 202 to operate as described herein. In some embodiments, intensifier mechanisms 204 include biasing mechanisms, such as springs, to facilitate movement of intensifier mechanisms 204.

Figure 15:
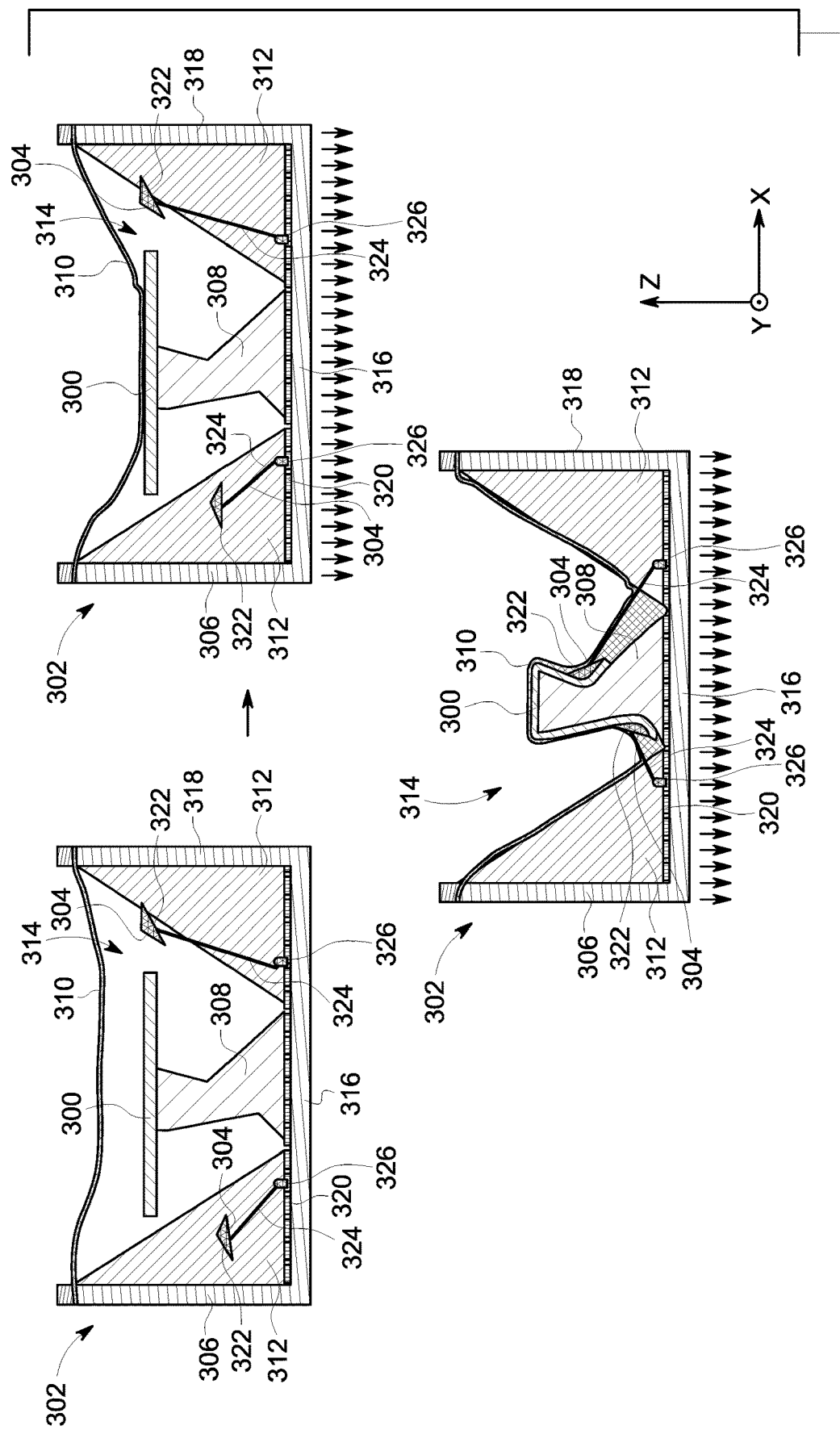
FIG. 15 is a schematic diagram of a sequence for forming stacked materials using an exemplary system including intensifier mechanisms.

FIG. 15 is a schematic diagram of a sequence of forming stacked material 300 using a system 302 including intensifier mechanisms 304. FIG. 15 includes an X-axis, a Y-axis, and a Z-axis for reference during the following description. System 302 includes intensifier mechanisms 304, a housing 306, a tool 308, a membrane 310, and inserts 312. Housing 306 defines an interior space 314 and includes a bottom wall 316, a side wall 318 coupled to bottom wall 316, and a perforated plate 320 disposed on bottom wall 316.

Intensifier mechanisms 304 include bodies 322 and a support 324. Support 324 is movably coupled to bottom wall 316 at a joint 326 such that intensifier mechanism 304 rotates about joint 326. In addition, support 324 is rotatably coupled to bodies 322 to facilitate bodies 322 rotating to contact stacked material 300 on tool 308. Intensifier mechanism 304 is configured such that body 222 moves in directions along both the X-axis and the Z-axis. Bodies 322 are shaped to correspond to a shape of tool 308. In some embodiments, intensifier mechanisms 304 and tool 308 are shaped to form corresponding male and female components. In alternative embodiments, intensifier mechanisms 304 have any configuration that enables system 100 to operate as described herein.

In reference to FIGS. 4-6 and 13, a method of forming stacked materials 102 includes coupling stacked material 102 to tool 106 disposed in interior space 122 of housing 104. Vacuum source 114 generates a vacuum pressure in interior space 122 such that membrane 108 moves toward bottom wall 116. Membrane 108 contacts stacked material 102 and forces stacked material 102 against tool 106 such that tool 106 shapes stacked material 102. Temperature control unit 110 maintains stacked material 102 at a desired temperature. For example, in some embodiments, temperature control unit 110 increases the temperature of stacked material 102 to facilitate tool 106 shaping stacked material 102. In further embodiments, the temperature of membrane 108 is increased. In some embodiments, membrane 108 contacts intensifier mechanism 304 to cause intensifier mechanism 304 to move. Intensifier mechanism 304 is positioned to cause stacked material 102 to contact tool 106 at predetermined locations. In further embodiments, intensifier mechanism 304 contacts stacked materials 102 with a predetermined force. In some embodiments, membrane 108 contacts insert 130 as membrane moves toward bottom wall 116. Insert 130 supports membrane 108 and controls the movement of membrane 108.

The above described systems include a membrane to facilitate forming stacked material into a component. The system includes a housing defining an interior space and a tool disposed in the interior space. The membrane is moved in the interior space towards the tool. In some embodiments, at least one insert is disposed in the interior space to control movement of the membrane and reduce stretching of the membrane. In further embodiments, at least one intensifier mechanism is disposed in the interior space to facilitate shaping the stacked material with the tool. The at least one intensifier mechanism is configured to cause the tool to shape the component into complex geometries. In some embodiments, the at least one intensifier mechanism provides contact pressure between the stacked material and the tool for increased compaction of the stacked material.

An exemplary technical effect of the methods, systems, and apparatus described herein includes at least one of: (a) increasing operating efficiency of systems for forming stacked materials; (b) enabling components formed from stacked materials to have complex geometries; (c) reducing the cost of forming stacked materials; (d) increasing the reliability of systems for forming stacked materials; (e) enabling stacked materials to be debulked during formation; (f) reducing cost and time required to form stacked materials; and (g) simplifying the forming process for stacked materials.

Some embodiments involve the use of one or more electronic or computing devices. Such devices typically include a processor or controller, such as a general purpose central processing unit (CPU), a graphics processing unit (GPU), a microcontroller, a field programmable gate array (FPGA), a reduced instruction set computer (RISC) processor, an application specific integrated circuit (ASIC), a programmable logic circuit (PLC), and/or any other circuit or processor capable of executing the functions described herein. In some embodiments, the methods described herein are encoded as executable instructions embodied in a computer readable medium, including, without limitation, a storage device, and/or a memory device. Such instructions, when executed by a processor, cause the processor to perform at least a portion of the methods described herein. The above examples are exemplary only, and thus are not intended to limit in any way the definition and/or meaning of the term processor.

Exemplary embodiments of systems for forming stacked materials are described above in detail. The systems, and methods of operating and manufacturing such systems are not limited to the specific embodiments described herein, but rather, components of systems and/or steps of the methods may be utilized independently and separately from other components and/or steps described herein. For example, the methods may also be used in combination with other forming systems, and are not limited to practice with only systems, and methods as described herein. Rather, the exemplary embodiment can be implemented and utilized in connection with many other applications for forming materials.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for forming stacked material, said system comprising:
    a housing defining an interior space and comprising a bottom wall and a side wall coupled to said bottom wall;
    at least one tool configured to shape the stacked material, said at least one tool disposed within said interior space;
    a membrane extending at least partially over said bottom wall and spaced a distance from said bottom wall, said membrane configured to move towards said bottom wall; and
    at least one intensifier mechanism comprising at least one support and at least one body, said at least one support and said at least one body disposed on the stacked material and in said interior space, wherein said at least one intensifier mechanism is configured to induce a force against a portion of the stacked material and against said at least one tool as said membrane is moved towards said bottom wall, and wherein said at least one body is movably coupled to said at least one support, wherein said at least one body is positioned on top of said at least one support, and wherein said at least one body is configured to pivot about said at least one support.

2. The system in accordance with claim 1, wherein said membrane contacts said at least one intensifier mechanism to move said at least one intensifier mechanism towards said at least one tool.

3. The system in accordance with claim 1 further comprising a liner extending adjacent the stacked material.

4. The system in accordance with claim 1, wherein said at least one tool is configured to support the stacked material, and said at least one intensifier mechanism is configured to move between a first position spaced from said at least one tool and a second position where said at least one intensifier mechanism induces a force against a portion of the stacked material and against said at least one tool.

5. The system in accordance with claim 1, wherein said at least one body has a shape that corresponds to a desired shape of a component formed from the stacked material.

6. The system in accordance with claim 1 further comprising a temperature control unit configured to maintain the stacked material at a desired temperature to facilitate shaping the stacked material using the tool.

7. A system for forming stacked material, said system comprising:
    a housing defining an interior space and comprising a bottom wall and a side wall coupled to said bottom wall;
    at least one tool configured to shape the stacked material, said at least one tool disposed within said interior space;
    a membrane extending at least partially over said bottom wall and spaced a first distance from said bottom wall, said membrane configured to move towards said bottom wall;
    at least one insert in said interior space; and
    at least one intensifier mechanism comprising at least one support and at least one body, said at least one support and said at least one body disposed on the stacked material and in said interior space, wherein said at least one intensifier mechanism is configured to induce a force against a portion of the stacked material and against said at least one tool as said membrane is moved towards said bottom wall, and wherein said at least one body is movably coupled to said at least one support, wherein said at least one body is positioned on top of said at least one support, and wherein said at least one body is configured to pivot about said at least one support.

8. The system in accordance with claim 7, wherein said at least one tool comprises a plurality of tools, said at least one insert dividing said interior space into a plurality of forming zones, said at least one insert extending at least partially between a first tool and a second tool of said plurality of tools.

9. The system in accordance with claim 7, wherein said at least one insert is removably coupled to said bottom wall.

10. The system in accordance with claim 7, wherein said at least one tool is disposed on said bottom wall, said at least one insert extending at least partially between said at least one tool and said side wall.

11. The system in accordance with claim 7, wherein said at least one tool extends a height above said bottom wall, said membrane coupled to said side wall a second distance above said bottom wall greater than the height of said at least one tool.

12. The system in accordance with claim 7, wherein said at least one insert is configured to at least partially contact said membrane as said membrane is lowered towards said bottom wall,
- the system further comprising at least one perforated plate disposed above the bottom wall,
- wherein the at least one perforated plate is angled relative to the bottom wall.

13. A method of forming stacked material, said method comprising:
- coupling the stacked material to a tool disposed in an interior space of a housing;
- moving a membrane towards the tool in the interior space of the housing;
- shaping the stacked material using the tool; and
- moving an intensifier mechanism such that the stacked material is compressed at predetermined locations, wherein the intensifier mechanism includes at least one support and at least one body, and wherein the at least one support and the at least one body are disposed on the stacked material and in the interior space, and wherein the at least one body is movably coupled to the at least one support, wherein said at least one body is positioned on top of said at least one support, and wherein said at least one body is configured to pivot about said at least one support.

14. The method in accordance with claim 13, wherein moving the intensifier mechanism comprises moving the intensifier mechanism to a position where the intensifier mechanism contacts the stacked material with a predetermined force.

15. The method in accordance with claim 13, wherein moving the intensifier mechanism comprises contacting the intensifier mechanism with the membrane.

16. The method in accordance with claim 13 further comprising contacting an insert with the membrane, the insert in the interior space.

17. The method in accordance with claim 13, wherein shaping the stacked material comprises shaping a plurality of stacked materials using a plurality of tools.

18. The method in accordance with claim 13 further comprising:
- generating a vacuum force in the interior space to facilitate drawing the membrane towards the tool; and
- maintaining the stacked material at a desired temperature to facilitate shaping the stacked material using the tool.

* * * * *